(12) United States Patent
Stolzer et al.

(10) Patent No.: US 10,946,461 B2
(45) Date of Patent: Mar. 16, 2021

(54) SAWING MACHINE FOR BEVEL CUTS

(71) Applicant: KEURO Besitz GmbH & Co. EDV-Dienstleistungs KG, Achern (DE)

(72) Inventors: Armin Stolzer, Baden-Baden (DE); Sonke Florian Krebber, Baden-Baden (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 0 days.

(21) Appl. No.: 16/437,608

(22) Filed: Jun. 11, 2019

(65) Prior Publication Data

US 2019/0375033 A1 Dec. 12, 2019

(30) Foreign Application Priority Data

Jun. 12, 2018 (DE) .................... 20 2018 103 299 U

(51) Int. Cl.
| | | |
|---|---|---|
| *B23D 53/04* | (2006.01) | |
| *B23D 55/02* | (2006.01) | |
| *B23D 55/04* | (2006.01) | |

(52) U.S. Cl.
CPC ........... *B23D 53/045* (2013.01); *B23D 55/02* (2013.01); *B23D 55/04* (2013.01); *Y10T 83/7214* (2015.04)

(58) Field of Classification Search
CPC ............. Y10T 83/7214; Y10T 83/7195; Y10T 83/7201; Y10T 83/7208; Y10T 83/707; B23D 53/045; B23D 53/00; B23D 53/02; B23D 53/023; B23D 53/026; B23D 53/06; B23D 53/08; B23D 55/02; B23D 55/04; B23D 55/00; B23D 55/026; B23D 55/023

See application file for complete search history.

(56) References Cited

U.S. PATENT DOCUMENTS

| | | | | |
|---|---|---|---|---|
| 4,275,632 A | * | 6/1981 | Ross | ....................... B27B 15/02 83/574 |
| 5,035,166 A | * | 7/1991 | Carlson | ................... B27B 15/02 83/801 |

(Continued)

FOREIGN PATENT DOCUMENTS

| | | |
|---|---|---|
| CN | 201799702 | 4/2011 |
| DE | 3916060 | 11/1989 |

(Continued)

*Primary Examiner* — Phong H Nguyen
(74) *Attorney, Agent, or Firm* — Volpe Koenig

(57) ABSTRACT

A sawing machine for bevel cuts having an upper saw portion with two running wheels, one of which is motor driven, a saw band which rotates about the running wheels, a lifting and lowering device for the upward and downward movement of the upper saw portion to move the saw band with a sawing advance movement in a sawing region, a transport path for supplying a workpiece in a supply direction to the sawing region, a frame, on which the upper saw portion is retained and which is pivotable about a vertical axis in order to adjust a bevel angle between the saw band and the supply direction. A movable sawing table is arranged in the sawing region for positioning the workpiece to be sawn and a clamping vice for clamping the workpiece during the sawing operation. The sawing table and the clamping vice are constructed to be movable in and counter to the supply direction.

15 Claims, 4 Drawing Sheets

(56) References Cited

U.S. PATENT DOCUMENTS

| | | | | |
|---|---|---|---|---|
| 5,119,310 A | * | 6/1992 | Moriya | B23D 55/086 |
| | | | | 700/192 |
| 5,320,016 A | * | 6/1994 | Spath | B23D 53/04 |
| | | | | 83/801 |
| 2006/0090623 A1 | * | 5/2006 | Diener | B23D 53/04 |
| | | | | 83/651 |
| 2008/0178720 A1 | * | 7/2008 | Trompert | B23D 55/04 |
| | | | | 83/23 |
| 2016/0236289 A1 | * | 8/2016 | Voortman | B23D 55/082 |

FOREIGN PATENT DOCUMENTS

| | | |
|---|---|---|
| DE | 4005143 | 8/1991 |
| DE | 19610175 | 9/1997 |
| EP | 0152237 | 8/1985 |
| EP | 0491120 | 6/1992 |
| EP | 3056307 | 8/2016 |
| JP | 2002144144 | 5/2002 |
| WO | 2006126883 | 11/2006 |

\* cited by examiner

SAWING MACHINE FOR BEVEL CUTS

INCORPORATION BY REFERENCE

The following documents are incorporated herein by reference as if fully set forth: German Patent Application No. 202018103299.2, filed Jun. 12, 2018.

BACKGROUND

The invention relates to a sawing machine for bevel cuts in metal workpieces. Such a sawing machine has an upper saw portion, in which a saw band rotates about at least two running wheels, at least one of which is driven in a motorized manner. The sawing machine is further provided with a lifting and lowering device that can be mechanical or hydraulic for the upward and downward movement of the upper saw portion in order to move the saw band with a sawing advance movement in a sawing region, that is to say, to bring about a cutting movement through a workpiece which is intended to be sawn with a running saw band. The lifting and lowering device may be in this instance a device which moves the upper saw portion up and down in translation; in the context of the present invention, however, it may also be a device for pivoting the upper saw portion about a substantially horizontal axis, whereby a rotational upward and downward movement of the saw band is produced in the sawing region. A combined rotational and translational movement of the upper saw portion is also possible.

A sawing machine of the present type further comprises a rectilinear transport path for supplying a workpiece which is intended to be sawn to the sawing region, wherein the supply movement along this transport path defines a supply direction. The upper saw portion is retained by a frame and this frame can be pivoted about a vertical axis in order to adjust a bevel angle between the saw band and the supply direction. Finally, a movable sawing table which is arranged in the sawing region is further provided to position the workpiece which is intended to be sawn during the sawing operation and a clamping vice for clamping the workpiece which is intended to be sawn during the sawing operation.

Band sawing machines for bevel cuts have been known for some time, for example, from DE4005143 C2, and are widespread. They allow particularly elongate metal workpieces, such as, for example, double-T beams, pipes and other profiles to be cut to length with a bevel angle of practically from −90 degrees to practically +90 degrees. A "bevel angle" of 0° corresponds in this instance to a straight cut in which the saw band is orientated orthogonally to the supply direction.

Both in the case of positive and in the case of negative bevel angles, geometric challenges are produced during the sawing because the workpiece must be clamped as close as possible to the cutting plane in order to ensure a precisely dimensionally accurate cut. As a result of the elongate form thereof, however, the clamping of the workpiece must be carried out between two clamping jaws, the clamping faces of which extend parallel with the supply direction or the longitudinal axis of the workpiece. In particular in the case of a bevel saw, there is used for this a clamping vice, of which one clamping jaw is constructed to be fixed in position while the other clamping jaw can be moved relative to the fixed clamping jaw in order to clamp or release the workpiece.

In order to adjust the bevel angle, it is advantageous and conventional to pivot the upper saw portion about a vertical axis which extends directly beside the fixed clamping jaw or in a recess thereof and through which the saw band can be guided. The location at which the saw band leaves the sawing region again varies at different bevel angles, however, so that the movable clamping jaw of the clamping vice is particularly in the way when negative bevel angles are intended to be sawn. Known remedial steps involve arranging the clamping vice further away from the sawing plane in order to release the pivot range of the bevel saw, which may lead to only moderately dimensionally accurate cuts as a result of the resilient movability of metal workpieces, or only the movable clamping jaw is removed from the pivot range, whereby, however, a non-symmetrical clamping force is produced in the clamping vice with correspondingly resulting torques and thrust forces, which again puts at risk a precise cut, or a possible negative bevel angle is completely dispensed with.

In order to prevent a non-symmetrical clamping with a movable clamping jaw which is adjustable in a supply direction, the fixed clamping jaw can also be widened in terms of the extent thereof in the supply direction so that the displacement path of the movable clamping jaw is covered and thus a symmetrical clamping force is ensured. However, it has been found that bevel saws are also used for straight cuts to a considerable extent. If, however, in the case of a straight cut a clamping vice is used to clamp the workpiece during the sawing operation and the fixed clamping jaw thereof is constructed to be particularly wide, residual pieces of the material which is intended to be sawn, the length of which pieces is less than the width of the fixed clamping jaw, can also be sawn by more in the case of automatic or automated supply of the workpiece, that is to say, long residual pieces are necessarily left over in a disadvantageous manner.

In EP0491120 B1, it has been proposed in relation to this problem that a clamping vice be used with a fixed clamping jaw and a movable clamping jaw which can be adjusted in the supply direction and in addition with a sawing table which is adjustable in the supply direction. However, the problem of a slanted, non-symmetrical clamping in the clamping vice during sawing particularly of flat bevel angles remains unsolved in this case.

SUMMARY

Starting from this prior art, an object of the invention is to improve a sawing machine for bevel cuts in metal workpieces of the type mentioned in the introduction so that, on the one hand, straight cuts are possible with only short residual pieces without, on the other hand, having to accept thrust forces in the workpiece during clamping in the clamping vice or excessively small clamping forces which could impair a precise dimensional stability of the saw cut.

This object is achieved by a sawing machine having one or more features of the invention. Preferred embodiments and developments of the sawing machine according to the invention are described below and in the claims.

The sawing machine according to the invention which comprises an upper saw portion having at least two running wheels, at least one of which is driven in a motorized manner, and having a saw band which rotates about the running wheels, and which further comprises a lifting and lowering device for the (translational and/or rotational) upward and downward movement of the upper saw portion in order to move the saw band with a sawing advance movement in a sawing region, a substantially rectilinear transport path for supplying a workpiece which is intended to be sawn in a supply direction to the sawing region, a frame, on which the upper saw portion is retained and which can be pivoted about a vertical axis which is orthogonal to the supply direction in order to adjust a bevel angle between the saw band and the supply direction, a movable sawing table which is arranged in the sawing region for positioning the workpiece which is intended to be sawn during the sawing operation and a clamping vice for clamping the workpiece which is intended to be sawn during the sawing operation, is accordingly distinguished in that the sawing table and the entire clamping vice are constructed in such a manner that they can be moved in and counter to the supply direction. In this case, the sawing table is preferably integrated in a movable clamping vice, that is to say, the movable clamping vice also forms a sawing table or the sawing table has clamping jaws in order to take on the function of a clamping vice.

The movability of the clamping vice generally in the supply direction allows the location at which the workpiece is symmetrically clamped to be selected in accordance with the adjusted bevel angle, wherein in principle a symmetrical or parallel clamping is carried out and it is nevertheless also possible to saw with straight cuts except for an advantageously short residual piece because the fixed clamping jaw of the clamping vice can advantageously be constructed to be narrow. The term "fixed" in the sense of the invention is intended to be understood to mean in connection with the corresponding clamping jaw that it does not carry out any movement perpendicular to the supply direction, that is to say, remains fixed with respect to the clamping movement of the clamping vice while a fixing in the supply direction is not, however, intended to be understood thereby because according to the invention the clamping vice as a whole, that is to say, also the fixed clamping jaw thereof, is movable in and counter to the supply direction.

It is particularly preferred according to the invention if the sawing table and the clamping vice or the integrated movable clamping vice can be secured in two positions, of which a first position is provided for a positive bevel angle of from 0 to practically +90 degrees and a second position is provided for a negative bevel angle of from practically −90 to 0 degrees. Thus, it can be carried out in the simplest manner as to how a workpiece can be clamped as close to the cutting plane as possible during bevel sawing: in the case of positive bevel angles, the clamping vice when viewed in the supply direction is arranged upstream of the cutting plane while it is arranged in the case of negative bevel angles in the supply direction downstream of the cutting plane and secured at that location. The entire pivot range of the saw band from 0° to +90° or from 0° to −90° is then thereby free.

The integration of the sawing table in a movable clamping vice is preferably carried out in such a manner that the sawing table is configured with a horizontal support face and a plate which is securely connected thereto and which acts as a fixed clamping jaw. The vertical plate cooperates with a clamping jaw which is movable relative to this vertical plate in order to form the clamping vice and to fix a workpiece during the sawing operation. Preferably, the movable clamping jaw is fixed directly to the sawing table and forms therewith a carriage which acts as a movable clamping vice which can be moved on sliding rails in and counter to the supply direction.

Additional advantages are afforded when the sawing table, according to a preferred development of the present invention, has at both sides of the vertical plate thereof a vertical guiding bar as an introduction rod for guiding the workpiece to be sawn during the supply movement. This vertical guiding bar can in this instance not only be used to guide the workpiece during the supply movement but also as a lateral support of the workpiece during sawing, especially since the saw band is preferably guided through between the vertical plate and the respective guiding bar. Since the sawing table which is integrated in a movable clamping vice is preferably arranged upstream of the cutting planes in the case of positive bevel angles and downstream of the cutting plane in the case of negative bevel angles, the vertical guiding bar acts for the workpiece portion which is intended to be separated as an abutment or lateral support, respectively.

Advantageously, the first and second positions of the movable clamping vice, in which the vice can be preferably secured for positive or negative bevel angles, are selected in such a manner that the saw band moves in the sawing region directly beside the vertical plate, preferably between the vertical plate and an adjacently arranged vertical guiding bar, and the vertical axis about which the upper saw portion can be pivoted also extends directly beside the vertical plate and is consequently located advantageously in the cutting plane or the plane of the saw band.

Since the sawing machine according to the invention is a sawing machine for sawing metal workpieces, the situation cannot be avoided that the saw band cuts into the sawing table at the end of the sawing operation if the saw band strikes the sawing table. Besides the fact that, during subsequent sawing operations, a supplied workpiece can become stuck during supply to sawing tracks in the sawing table, and in addition to the risk of an increased formation of chips on the workpiece because of a surface of the sawing table which has become uneven as a result of sawing tracks, the need for having to replace a repeatedly sawn sawing table from time to time is a cost factor which must be considered.

In order to reduce these additional costs, it is advantageous, in the context of the present invention, to fit in a region around the vertical axis, about which the upper saw portion can be pivoted, to the sawing table or in a state integrated in the sawing table surface a rotary plate which is preferably constructed so as to also pivot with the upper saw portion. Such a rotary plate prevents an extensive indentation of the sawing table surface from being produced relatively quickly in the region of the vertical axis, in which sawing tracks are located particularly close together on the sawing table surface, which indentation could substantially disrupt the supply of workpieces.

As an alternative to the rotary plates, it is preferable in the context of the present invention if the horizontal support face of the sawing table is constructed in the supply direction so as to be substantially of the same width as the vertical plate of the sawing table, wherein the saw band, when viewed in a vertical projection, that is to say, when seen in a projection from above onto the sawing table, extends beside the horizontal support face. This means that the saw band does not strike the surface of the sawing table when the workpiece is finished being sawn and accordingly also cannot cause any sawing tracks at that location.

The horizontal support face of the sawing table can, again when viewed in the supply direction, also be constructed to be narrower than the vertical plate of the sawing table in such a manner that it is possible to fit an additional bar, which is located in the cutting plane, as a wear part to the edge of the horizontal support face, that is to say, the saw band strikes this bar at the end of the saw cut. Although the bar is thereby worn, it can be replaced in a simple and cost-effective manner while it ensures that the workpiece is also positioned in the cutting plane during sawing. This may be advantageous with regard to an undesirable formation of chips.

In the context of the present invention, it is very particularly preferable for at least one pivotable cutting bar to be fitted beside the sawing table—preferably at both sides of the sawing table—wherein this cutting bar can be pivoted together with the upper saw portion about substantially the same vertical axis. The cutting bar has a horizontal surface which substantially forms a plane with the horizontal support face of the sawing table so that as a result the workpiece is always supported at both sides of the cutting plane: at one side, by the sawing table and, at the other side, by the pivotable cutting bar. This plane which is formed by the horizontal support face of the sawing table and the horizontal surface of the cutting bar is interrupted by a gap, in which—again when viewed in a vertical projection—the saw band extends. At the end of the sawing operation, therefore, the saw band is located in this gap so that there is also no risk of the surface of the cutting bar receiving sawing tracks. This gap naturally widens more and more as the upper saw portion and therefore also the cutting bar are pivoted further and further, that is to say, the greater is the adjusted bevel angle.

It may also be advantageous in such a cutting bar to fit a wear bar which can be replaced simply and cost-effectively and which is located in the cutting plane in order also to support the workpiece during the sawing operation at this location. To this end, the cutting bar can advantageously be provided with a shoulder for fitting a wear bar at the side thereof orientated toward the horizontal support face of the sawing table, that is to say, at the side directed toward the gap.

Preferably, a mechanical coupling is provided between the cutting bar and the frame which carries the upper saw portion and which can be selectively activated and deactivated. An engaging carrier on the frame which automatically carries the cutting bar when the bevel angle is adjusted is preferred in this instance.

In order also to ensure a defined position of the cutting bar when it is not connected to the frame, it is advantageous for the pivotable cutting bar and/or the sawing table to have a securing device in order to secure the cutting bar to the sawing table, when necessary. This is particularly advantageous if the sawing table is moved in or counter to the supply direction because the securing prevents uncontrolled pivoting of the cutting bar.

If two pivotable cutting bars are provided and the sawing table or the integrated movable clamping vice can be secured in two positions, one for positive and one for negative bevel angles, one of the two pivotable cutting bars covers the region of the positive bevel angle while the other of the two cutting bars covers the region of the negative bevel angle and supports the workpiece in this case actively directly beside the cutting plane, even if it is relatively far away from the sawing table in the case of larger bevel angles. The dimensional accuracy of the saw cut can thereby be ensured more effectively.

In band sawing machines, it is conventional and generally necessary to guide the saw band at both sides of the sawing region with band guides. These guides generally comprise a pincer-like holder with sliding pieces for sliding contact with the saw band. The band guides prevent the saw band from tilting about the longitudinal axis thereof during sawing as a result of the sawing resistance. Depending on the orientation of the running wheels in the upper saw portion, it is also necessary for the band guides to rotate the saw band by up to 90° about the longitudinal axis thereof because otherwise the saw teeth are not orientated downward or toward the workpiece.

As a result of the functions which are attributed to the band guides, it is necessary in the context of an exact saw cut for the band guides to be arranged as close as possible to the workpiece which is intended to be sawn. Therefore, it is conventional to arrange at least one of the band guides on an adjustable arm in order to displace this then adjustable band guide closer to the other band guide or further away from it depending on the width of the workpiece to be sawn.

In bevel saws, such adjustability of the spacing of the band guides is also advantageous, if not even necessary, when the width of the workpieces to be sawn does not vary at all. This is because, when sawing is carried out at a bevel angle, the cutting channel in the workpiece lengthens as a result of the geometric relationships, and therefore also the necessary free length in the saw band in the sawing region. The flatter the bevel angle becomes, the further the band guides must be moved apart from each other.

In known bevel saws, it is still conventional for an adjustable band guide also to be adjusted accordingly when adjusting the bevel angle which is carried out by hand or in a motorized manner. However, it has been found that during daily use an adjustment of the band guide is forgotten and the adjustable band guide is therefore set by many users to the largest possible distance from the other band guide in order also not to have any problem during sawing if the adjustment of the band guide is forgotten. However, this results in poorer results in the case of the precision of the saw cut.

Therefore, it is preferable in the context of the present invention not only to provide two band guides for guiding the saw band at both sides of the sawing region, at least one of which is adjustable, but also to configure the adjustable band guide in a motorized manner in order to increase or decrease a cutting width between the two band guides, and further to provide a controller for the motorized adjustment in order to adjust the cutting width in accordance with the adjusted bevel angle, respectively.

To this end, a measurement device for measuring the width of the workpiece which is intended to be sawn is preferably fitted in the region of the transport path and/or the sawing table, wherein the controller adjusts the sawing width in accordance with the measured width of the workpiece which is intended to be sawn and the adjusted bevel angle, taking into consideration the geometrical relationships resulting therefrom, so that the smallest possible spacing of the two band guides is adjusted. In this instance, the measuring device may in the simplest case be a measurement scale for reading the width of the workpiece which is intended to be sawn, wherein an operator has to read this width and has to input it into the controller. In the rough ambient conditions within a sawing machine, this may be the most advantageous configuration of a measuring device. Alternatively, however, it may also be advantageous to use as a measuring device a measuring apparatus which is connected to the controller and which automatically inputs the measured measurement values into the controller.

Finally, it is preferable in the context of the invention for supply clamping jaws, which can be moved in the supply direction forward and backward, to be provided on the transport path. Such supply clamping jaws have also been known per se for some time in band sawing machines; they also ensure exact dimensional stability in the case of particularly heavy workpieces during advance, which is ultimately responsible for the dimensional stability of the workpiece portion which is intended to be separated per saw cut.

In connection with such supply clamping jaws, the concept according to the invention of a movable clamping vice in a bevel saw is particularly advantageous because it allows, as already explained, at the supply side only a very small projection of the clamping vice or the sawing table beyond the sawing plane to have to be accepted, if a projection is present at all, and consequently the supply clamping jaws can be moved as far as a location right at or almost right at the sawing plane. This affords the great advantage that only very short residual pieces are left over during sawing.

BRIEF DESCRIPTION OF THE DRAWINGS

An embodiment of a sawing machine according to the invention is described and explained in greater detail below with reference to the appended drawings, in which.

DETAILED DESCRIPTION

Figure 1:
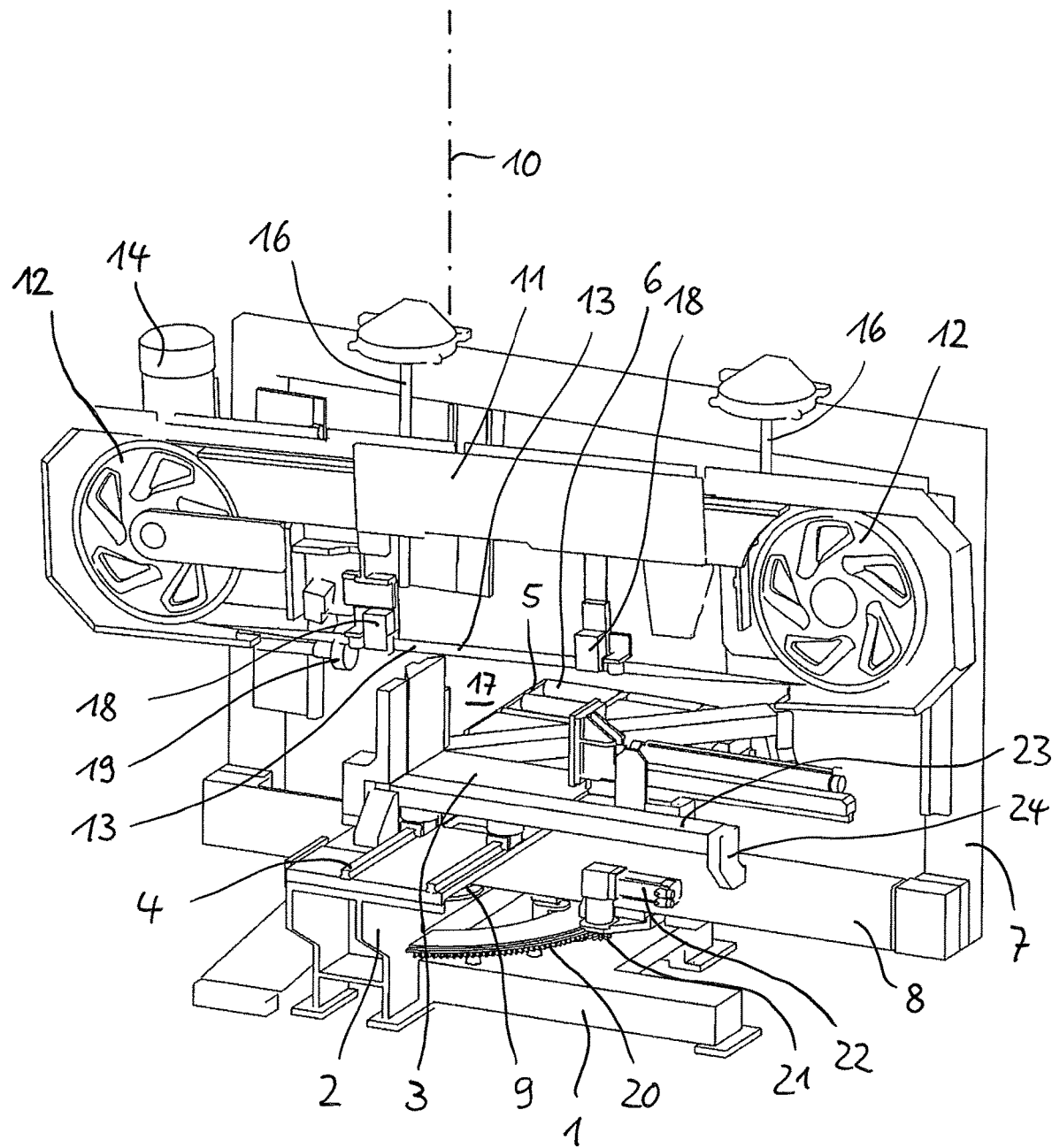
FIG. 1 is a schematic perspective view of a sawing machine which is configured according to the invention.

The embodiment which is shown in FIG. 1 as a schematic perspective view of a sawing machine which is configured according to the invention for bevel cuts in metal workpieces comprises, in addition to the housing and fitted parts, which have been omitted here for better depiction of the invention, a fixed base 1 having a carrier 2 for a sawing table 3 which can be displaced along two rails 4 on the carrier 2. A supply roller path 6 is fixed as a transport path 5 to the carrier 2 of the base 1 at a supply side of the sawing machine which is at the rear in the present illustration.

On the base 1, there is pivotably fixed a frame 7 in the form of a framework, wherein a lower bar 8 of the frame 7 is positioned to this end with a journal (not visible) in a radial bearing 9 and can be pivoted about a vertical axis 10.

The frame 7 carries an upper saw portion 11 having two running wheels 12, about which a saw band 13 rotates continuously. The running wheel 12 illustrated on the left in FIG. 1 is driven in a motorized manner by means of an electric motor 14 in order to bring about a rotational movement of the saw band 13.

The upper saw portion 11 further has a lifting and lowering device 15 (hidden here, cf., FIG. 4), with which it can be lifted and lowered on two threaded spindles 16 which are securely connected to the frame 7. In this embodiment, consequently, a purely translational lifting and lowering movement for the saw advance is involved.

Since the running wheels 12 of the upper saw portion 11 in the present embodiment have substantially horizontally orientated rotation axes, the saw band 13 accordingly runs with a horizontal orientation around the running wheels 12. Therefore, it is necessary to provide in each case upstream and downstream of a sawing region 17 a band guide 18 which is constructed in a pincer-like manner and which rotates via hard metal sliding pieces the saw band 13 from a horizontal orientation into a vertical orientation so that in the sawing region 17 the saw teeth are orientated downward in the direction toward the sawing table 3. The band guides 18 also ensure that the saw band 13 in the sawing region 17 cannot tilt about the longitudinal axis thereof during the sawing operation. The band guide 18 illustrated on the right in FIG. 1 can be adjusted along the saw band 13, which is described in greater detail below with reference to FIG. 4.

Finally, a rotating chip removal brush 19 ensures the removal of saw chips which become bonded to the saw band 13 in particular in the region of the saw teeth.

The pivoting movement of the frame 7 and therewith of the upper saw portion 11 about the vertical axis 10 is carried out by a motorized bevel angle adjustment. To this end, the base 1 is provided with a toothed wheel portion 20 which is fixed thereon and in which a toothed wheel 21 which is positioned on a shaft of a toothed wheel drive 22 fitted to the bar 8 of the frame 7 engages.

Figure 2:
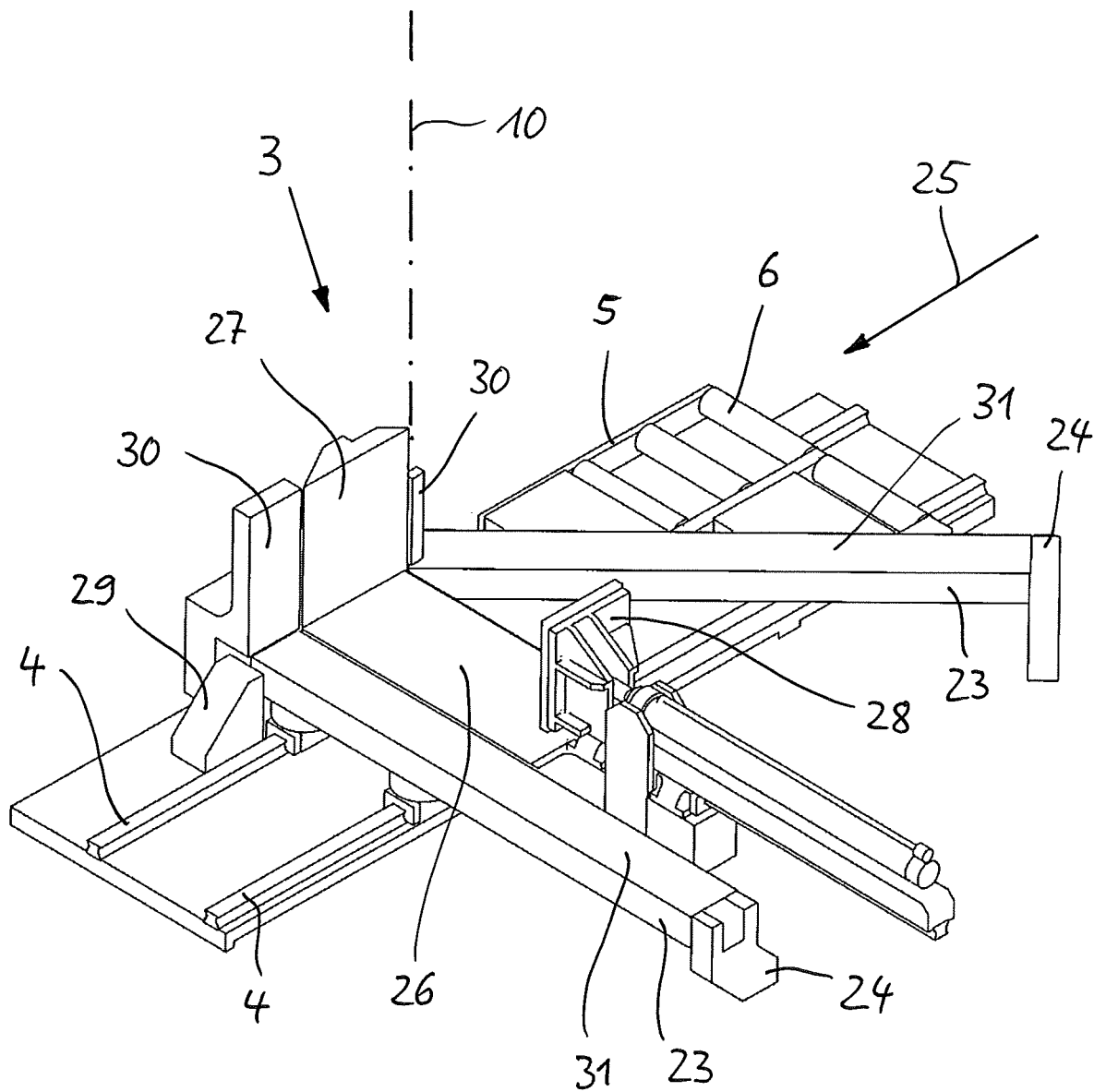
FIG. 2 is a schematic perspective view of the movable clamping vice from the sawing machine according to FIG. 1.

The sawing table 3 is described in greater detail for the sake of greater clarity in connection with FIG. 2. With reference to FIG. 1, it only remains to be mentioned that the sawing table 3 is provided with pivotable cutting bars 23 which each have at the end side a carrier 24 which can engage on the bar 8 of the frame 7 and which is carried thereby during the pivoting of the frame 7, wherein the pivot axis thereof substantially corresponds to the vertical axis 10.

FIG. 2 is a schematic perspective view, as in FIG. 1 but with some elements being omitted, of inventively significant components of the present embodiment. The sawing table 3 which can be adjusted on two rails 4 in a supply direction 25 is involved here. This sawing table 3 has a horizontal support face 26 and a vertical plate 27 which is fixedly connected thereto. A clamping jaw 28 which is movable relative to the vertical plate 27 is fixed to the sawing table 3 and forms therewith, in particular with the vertical plate 27, a clamping vice which is movable in the supply direction 25. A stop 29 limits the movement thereof along the rails 4 and ensures the illustrated position of the sawing table 3 counter to any forces which can act on the sawing table 3 from a workpiece which is transported on the transport path in the supply direction 25.

The vertical axis 10, about which the frame 7 and therewith the upper saw portion 11 can be pivoted in order to adjust a bevel angle, extends, as illustrated in FIG. 2, directly beside the vertical plate 27 and the saw band 13 also runs through the vertical axis 10 so that a cutting plane, within which the saw band 13 runs during the sawing operation, is located directly beside the vertical plate 27, when viewed in the supply direction 25, here in front of the vertical plate 27. The horizontal support face 26 of the sawing table 3 is constructed to be as wide in the supply direction 25 as the vertical plate 27 so that, as illustrated with reference to FIG. 2, the saw band 13, in the case of any straight cut, in which the saw band 13 extends perpendicularly to the supply direction 25, ends the saw cut beside the horizontal support face 26 of the sawing table 3. Therefore, there is no risk that sawing will be carried out in the horizontal support face 26.

There are provided in the supply direction 25 upstream and downstream of the vertical plate 27 vertical guiding bars 30 which serve to guide a workpiece; in order also to be able to adjust flat bevel angles, the vertical plate 27 must be provided with acutely angled edges and a workpiece should be prevented from striking such an edge. This is a main function of the guiding bars 30 in addition to the lateral support of the workpiece and a portion cut off therefrom.

As already mentioned with reference to FIG. 1, the sawing table 3 is finally further provided at each of the two sides with a pivotable cutting bar 23 which can be pivoted via carriers 24 together with the frame 7 and consequently together with the upper saw portion 11 and the saw band 13. In the present FIG. 2, a negative bevel angle of approximately −45° is adjusted, for which reason the cutting bar 23 which is arranged in front of the clamping vice 27, 28 (when viewed in the supply direction 25) has been pivoted about the same 45° amount. The saw band 13 therefore extends, starting from the vertical axis 10, along the pivoted cutting bar 23, but when viewed in a vertical projection further between the cutting bar 23 and the horizontal support face 26 so that the saw band 13 does not saw either into the support face 26 or into a horizontal surface 31 of the cutting bar 23 at the end of the sawing operation. At the same time, the horizontal surface 31 of the cutting bar 23 and the horizontal support face 26 of the sawing table 3 or the movable clamping vice 27, 28 form a common support face for a workpiece which is intended to be sawn and which is accordingly supported at both sides of the cutting plane.

Corresponding steps are carried out in the case of positive bevel angles, wherein the cutting bar 23 which is arranged in front of the movable clamping vice 27, 28 in the supply direction 25 is then pivoted back and abuts the sawing table 3 while the cutting bar 23 which is arranged after the movable clamping vice 27, 28 is pivoted in accordance with the positive bevel angle which is intended to be adjusted.

To this end, the position of the sawing table 3 or the movable clamping vice 27, 28 is then adjusted by being displaced along the rails 4 counter to the supply direction 25 into a second position, in which the vertical axis 10 then extends at the other side of the vertical plate 27, when viewed in the supply direction 25 behind the vertical plate 27 and between the plate 27 and the guiding bar 30 which follows it.

Since the sawing table 3 has then been adjusted so that the sawing plane extends at the other side thereof, there is then no risk again of the saw band sawing into any surface of the sawing table 3; instead, the saw band extends when viewed as a vertical projection within the gap between the horizontal support face 26 and the cutting bar 23 which is arranged behind the movable clamping vice 27, 28 in the supply direction.

The first position illustrated in FIG. 2 is accordingly provided for negative bevel angles while a second position (not illustrated) is selected for positive bevel angles. In both cases, the workpiece is retained by the movable clamping vice 27, 28 as close as possible to the cutting plane and clamped symmetrically without undesirable transverse forces or thrust forces being produced by the clamping.

Figure 3:
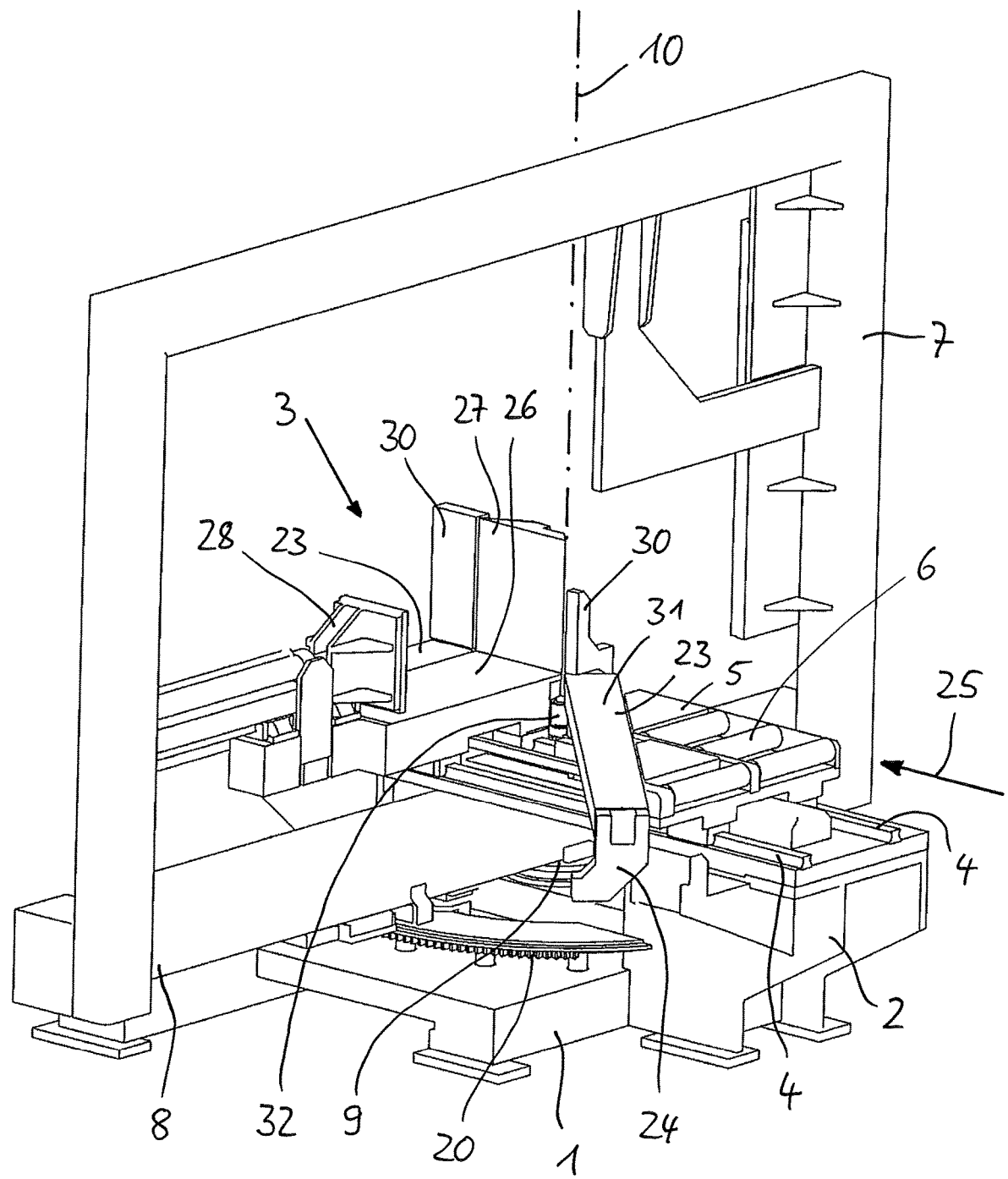
FIG. 3 shows the sawing machine from FIG. 1 from the rear, wherein the upper saw portion has been omitted for reasons of clarity.

FIG. 3 shows the sawing table 3 in the installation position illustrated in FIG. 2 in the sawing machine according to the invention, wherein some components have again been omitted with respect to FIG. 1, in particular the upper saw portion 11, in order to ensure greater clarity. In all the drawings, the same components are continuously indicated with the same reference numerals so that reference may be made to the descriptions in relation to FIGS. 1 and 2 in addition.

FIG. 3 again illustrates the base 1 with the carrier 2 on which the sawing table 3 is retained in a state displaceable on rails 4 in the supply direction 25. The transport path 5 is produced with a supply roller path 6 in order to supply workpieces to the sawing table 3. The support for such a workpiece is formed by the horizontal support face 26 and the two horizontal surfaces 31 of the cutting bars 23. In FIG. 3, the sawing table 3, as in FIG. 2, is secured in a position which is provided for negative bevel angles, wherein the cutting bar 23 which is located at the front in the supply direction 25 is pivoted through an angle of approximately −45°. This illustration shows a rotary bearing 32, about which the cutting bar 23 has been pivoted and which is also arranged in the vertical axis 10. The cutting bar 23 is therefore pivoted about the same vertical axis 10 and about the same bevel angle as the frame 7.

In the illustration of the sawing machine selected in FIG. 3, however, no bevel angle or a bevel angle of 0° is adjusted; that is to say, the frame 7 is arranged for a straight cut. The pivoted cutting bar 23 is only pivoted for reasons of illustration. This illustration shows that any supply clamping jaws (not illustrated here) can be guided up to a location almost at the sawing plane marked by the vertical axis 10 if a straight cut is intended to be carried out. This is ensured by the particularly narrow configuration of the guiding bar 30 which is arranged in the supply direction 25 in front of the vertical axis 10 or the cutting plane.

The cutting bar 23 which is arranged in the supply direction 25 behind the displaceable clamping vice 27, 28 is accordingly pivotable with a rotary bearing which cannot be seen here. If the sawing table 3 or the adjustable clamping vice 27, 28 is displaced counter to the supply direction 25 into the position thereof for positive bevel angles, the intermediate space between the guiding bar 30 located behind in the supply direction and the vertical plate 27 of the sawing table 3 comes to rest in the vertical axis 10 so that accordingly the rotary bearing of the rear cutting bar 23 is arranged in the vertical axis 10 and the rear cutting bar 23 can be pivoted with and parallel with the frame 7.

The half of the toothed wheel portion 20 visible in FIG. 3 is accordingly provided for adjusting a negative bevel angle.

Figure 4:
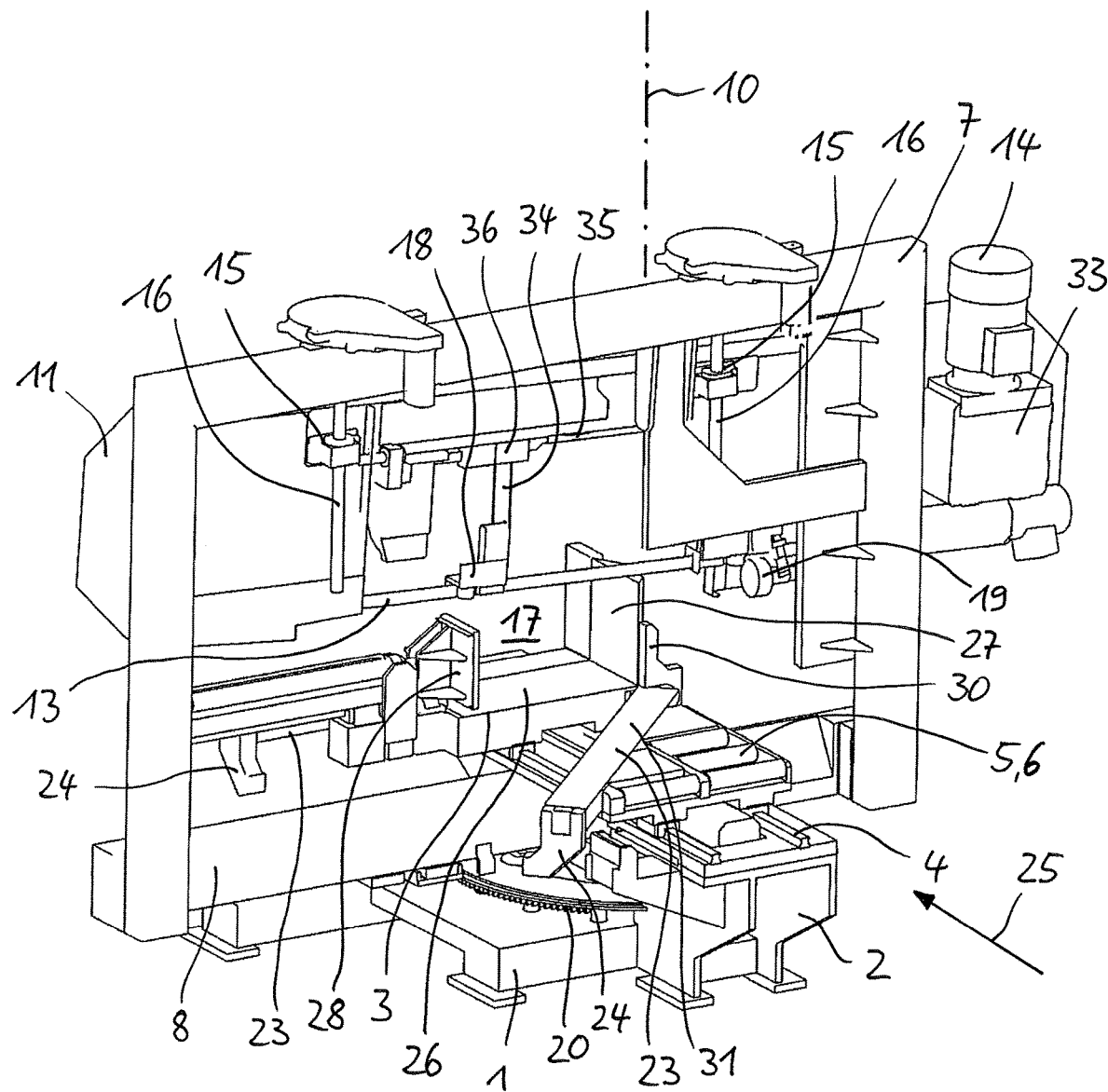
FIG. 4 is an illustration similar to FIG. 3, but with the upper saw portion.

FIG. 4 shows the embodiment illustrated in the preceding figures for a sawing machine which is configured according to the invention in comparison with FIG. 1 as a rear view. In this view, the running wheels 12 cannot be seen but the drive thereof by an electric motor 14 and a gear mechanism 33 can be seen. Furthermore, this view clearly shows the lifting and lowering device 15 and the threaded spindles 16, by which the upper saw portion 11 and therewith the saw band 13 can be raised and, for a saw advance movement, lowered. In this case, the two spindles 16 ensure that the saw band 13 is moved with a translational movement parallel with the horizontal support face 26 of the sawing table 3 for the saw advance and return movement.

This illustration also clearly shows that the band guide 18 arranged on the left here can be adjusted along the saw band 13 in a motorized manner in order to be able to adjust a sawing width or a width of the sawing region 17. To this end, this movable band guide 18 is positioned on a guide arm 34 which is itself retained on an adjustment spindle 35 and which can be moved along it by an adjustment motor 36. A controller (not illustrated) of the adjustment motor 36 ensures that the guide arm 34 and therewith the adjustable band guide 18 adjusts in accordance with the workpiece width (for example, in accordance with the spacing between the vertical plate 27 and the movable clamping jaw 28 in the clamped state, for which at the movable clamping jaw 28 an incremental sensor may be provided in order to automatically measure the spacing and to communicate it to the controller) and the adjusted bevel angle by the optimum spacing between the two band guides 18 being selected taking into consideration the necessary cutting width.

The advantages according to the invention are afforded with the sawing machine which is illustrated in FIGS. 1 to 4 and which is configured according to the invention and which constitutes an embodiment of the present invention, that is to say, the sawing machine is suitable both for bevel cuts and for straight cuts, wherein in particular in the latter case sawing can be carried out except for an advantageously very small residual piece length. Automatic operation of the sawing machine, that is to say, an automatic supply via forwardly and backwardly movable supply clamping jaws is possible. At the same time, the workpiece is clamped as close as possible to the cutting plane, wherein this clamping is always carried out parallel or symmetrically and thereby no non-symmetrical stresses in the material or corresponding thrust force are produced. It is thereby also possible to saw workpiece assemblies in one sawing operation.

Sawing into the sawing table is not brought about although the workpieces are advantageously supported both in front of and behind the cutting plane by a support face. Finally, the band guides are optimally adjusted in accordance with the adjusted bevel angle in order to ensure a high level of cutting precision.

LIST OF REFERENCE NUMERALS

1 Base
2 Carrier
3 Sawing table
4 Rails
5 Transport path
6 Supply roller path
7 Frame
8 Bar
9 Radial bearing
10 Vertical axis
11 Upper saw portion
12 Running wheel
13 Saw band
14 Electric motor
15 Lifting and lowering device
16 Threaded spindle
17 Sawing region
18 Band guide
19 Chip removal brush
20 Toothed wheel portion
21 Toothed wheel
22 Toothed wheel drive
23 Cutting bar
24 Carrier
25 Supply direction
26 Horizontal support face
27 Vertical plate
28 Movable clamping jaw
29 Stop
30 Guiding bar
31 Horizontal surface (of 23)
32 Rotary bearing
33 Gear mechanism
34 Guide arm
35 Adjustment spindle
36 Adjustment motor

The invention claimed is:

1. A sawing machine for bevel cuts in metal workpieces, comprising:
   an upper saw portion (11) having at least two running wheels (12), at least one of which is motor driven;
   a saw band (13) which rotates about the running wheels (12);
   a lifting and lowering device (15) for the upward and downward movement of the upper saw portion (11) in order to move the saw band (13) with a sawing advance movement in a sawing region (17);
   a transport path (5) for supplying a workpiece which is intended to be sawn in a supply direction (25) to the sawing region (17);
   a frame (7), on which the upper saw portion (11) is retained and which can be pivoted about a vertical axis (10) in order to adjust a bevel angle between the saw band (13) and the supply direction (25);
   a movable sawing table (3) which is arranged in the sawing region (17) for positioning the workpiece which is intended to be sawn;
   a clamping vice (27, 28) for clamping the workpiece which is intended to be sawn during the sawing operation; and
   the movable sawing table (3) and the clamping vice (27, 28) are movable linearly in and counter to the supply direction (25).

2. The sawing machine as claimed in claim 1, wherein the movable sawing table (3) and the clamping vice (27, 28) are securable in first and second positions, of which the first position is provided for a bevel angle which is greater than or equal to 0 degrees and the second position is provided for a bevel angle which is less than or equal to 0 degrees.

3. The sawing machine as claimed in claim 1, wherein the movable sawing table (3) is integrated in the clamping vice (27, 28) which is movable.

4. The sawing machine as claimed in claim 1, wherein the movable sawing table (3) has a horizontal support face (26) and a vertical plate (27) which is securely connected thereto and which cooperates with a clamping jaw (28) that is movable relative thereto in order to form the clamping vice (27, 28) that is adapted to fix a workpiece during the sawing operation.

5. The sawing machine as claimed in claim 4, wherein the movable clamping jaw (28) is fixed to the movable sawing table (3) and forms therewith the clamping vice which is movable and is adapted to be moved on rails (4) in and counter to the supply direction (25).

6. The sawing machine as claimed in either claim 5, wherein the movable sawing table (3) has at both sides of the vertical plate a vertical guiding bar (30) for guiding the workpiece to be sawn during the supply movement.

7. The sawing machine as claimed in claim 6, wherein the movable sawing table (3) and the clamping vice (27, 28) are securable in first and second positions, of which the first position is provided for a bevel angle which is greater than or equal to 0 degrees and the second position is provided for a bevel angle which is less than or equal to 0 degrees, and the first and second positions are selected in such that the saw band (13) moves in the sawing region directly beside the vertical plate (27) and the vertical axis (10) about which the upper saw portion (11) is pivotable also extends directly beside the vertical plate (27).

8. The sawing machine as claimed in claim 7, wherein the movable sawing table (3) is provided in a region around the vertical axis (10) with rotary plates which are constructed to also pivot with the upper saw portion (11).

9. The sawing machine as claimed in claim 7, wherein the horizontal support face (26) of the movable sawing table (3) is substantially as wide as or narrower than the vertical plate (27) in the supply direction (25), and the saw band (13) runs in a vertical projection beside the horizontal support face (26).

10. The sawing machine as claimed in claim 9, wherein at least one pivotable cutting bar (23) is fitted beside the movable sawing table (3) and is pivotable together with the upper saw portion (11) about substantially the same vertical axis (10), and has a horizontal surface (31) which substantially forms with the horizontal support face (26) of the movable sawing table (3) a plane which is interrupted by a gap, in which in a vertical projection the saw band (13) runs.

11. The sawing machine as claimed in claim 10, wherein the cutting bar (23) is provided with a shoulder for fitting a wear bar at a side thereof orientated toward the horizontal support face (26) of the sawing table (3).

12. The sawing machine as claimed in either claim 11, wherein the cutting bar (23) is connectable via a mechanical coupling to the frame (7) which carries the upper saw portion (11).

13. The sawing machine as claimed in 12, wherein at last one of the pivotable cutting bar (23) or the movable sawing table (3) have a securing device that is adapted to secure the cutting bar (23) to the movable sawing table (3) when necessary.

14. The sawing machine as claimed in claim 1, wherein the upper saw portion (11) further includes two band guides (18) for guiding the saw band (13) at both sides of the sawing region (17), at least one of said two band guides (18) is adjustable via a motor in order to increase or decrease a cutting width between the two band guides (18), and a controller configured for controlling a motorized adjustment of the adjustable band guide (18) in order to adjust the cutting width in accordance with an adjusted bevel angle.

15. The sawing machine as claimed in claim 14, further comprising a measurement device for measuring a width of the workpiece which is intended to be sawn fitted in a region of at least one of the transport path (5) or the movable sawing table (3), and the controller is configured to adjust the sawing width in accordance with the measured width of the workpiece which is intended to be sawn and the adjusted bevel angle, respectively.

* * * * *